United States Patent [19]

Spears

[11] Patent Number: 4,753,094
[45] Date of Patent: Jun. 28, 1988

[54] APPARATUS AND METHOD OF POWDER-METAL PEEN COATING METALLIC SURFACES

[76] Inventor: Richard L. Spears, 428 Elks Rd., Seminole, Okla. 74868

[21] Appl. No.: 876,032

[22] Filed: Jun. 19, 1986

[51] Int. Cl.⁴ .................... B21D 53/10; B05D 3/00; C21D 9/46
[52] U.S. Cl. .................................... 72/53; 72/43; 72/42; 51/320; 427/11
[58] Field of Search ............. 72/42, 46, 53, 44, 43; 427/289, 190, 191, 192, 11, 421; 51/26, 320, 410

[56] References Cited

U.S. PATENT DOCUMENTS

| | | | |
|---|---|---|---|
| 3,574,658 | 4/1971 | Fulk et al. | 117/3 |
| 3,754,976 | 8/1973 | Babecki et al. | 117/105 |
| 4,228,670 | 10/1980 | Corti et al. | 72/53 |
| 4,312,900 | 1/1982 | Simpson | 427/181 |
| 4,552,784 | 11/1985 | Chu et al. | 427/192 |
| 4,553,417 | 11/1985 | Badger | 72/42 |

FOREIGN PATENT DOCUMENTS 9312  3/1984  Japan ........................... 51/320

OTHER PUBLICATIONS

"Molybdenum Disulfide as a Lubricant", W. O. Winer, 1967, pp. 430–452.
"Glass-Bead Peen Plating", James R. Graves Feb. 1974, pp. 1–15.

*Primary Examiner*—David Jones
*Attorney, Agent, or Firm*—Robert K. Rhea

[57] ABSTRACT

An apparatus and method for thin film coating a substrate comprising spraying a stream of molybdenum disulfide powder mixed with steel shot at a predetermined velocity against the substrate, the velocity being sufficient, when impacting the substrate, to bond minute plate-like particles of molybdenum disulfide to the substrate and form a friction reducing surface thereon.

1 Claim, 3 Drawing Sheets

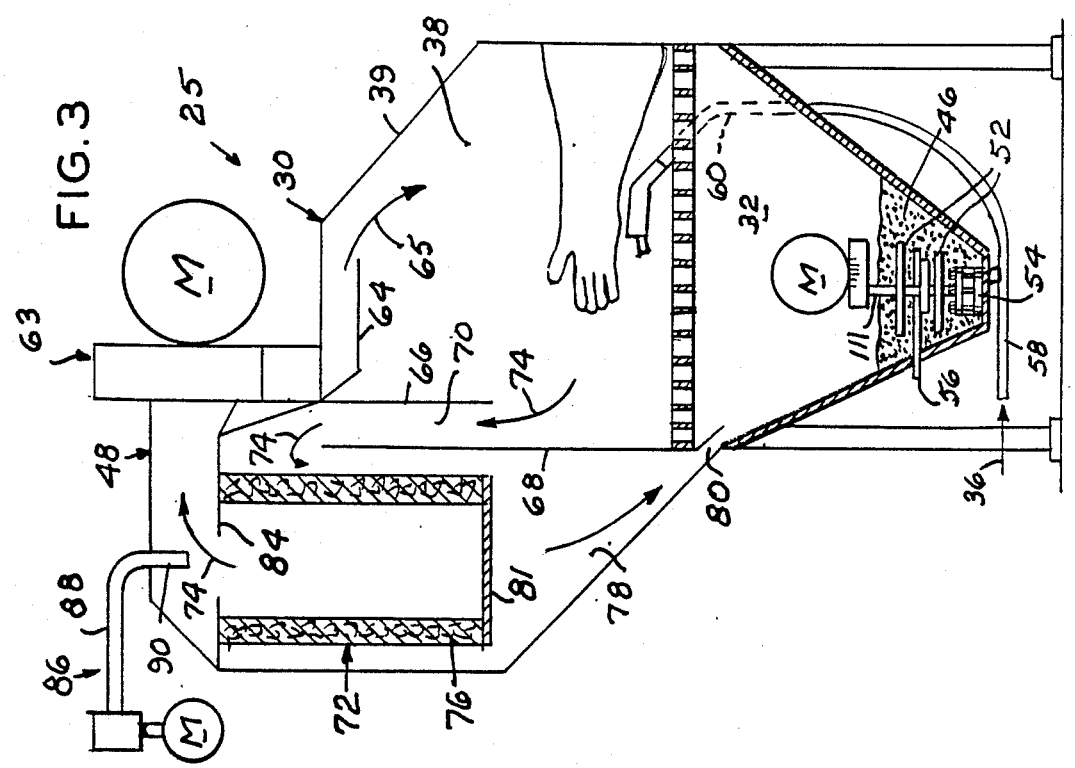
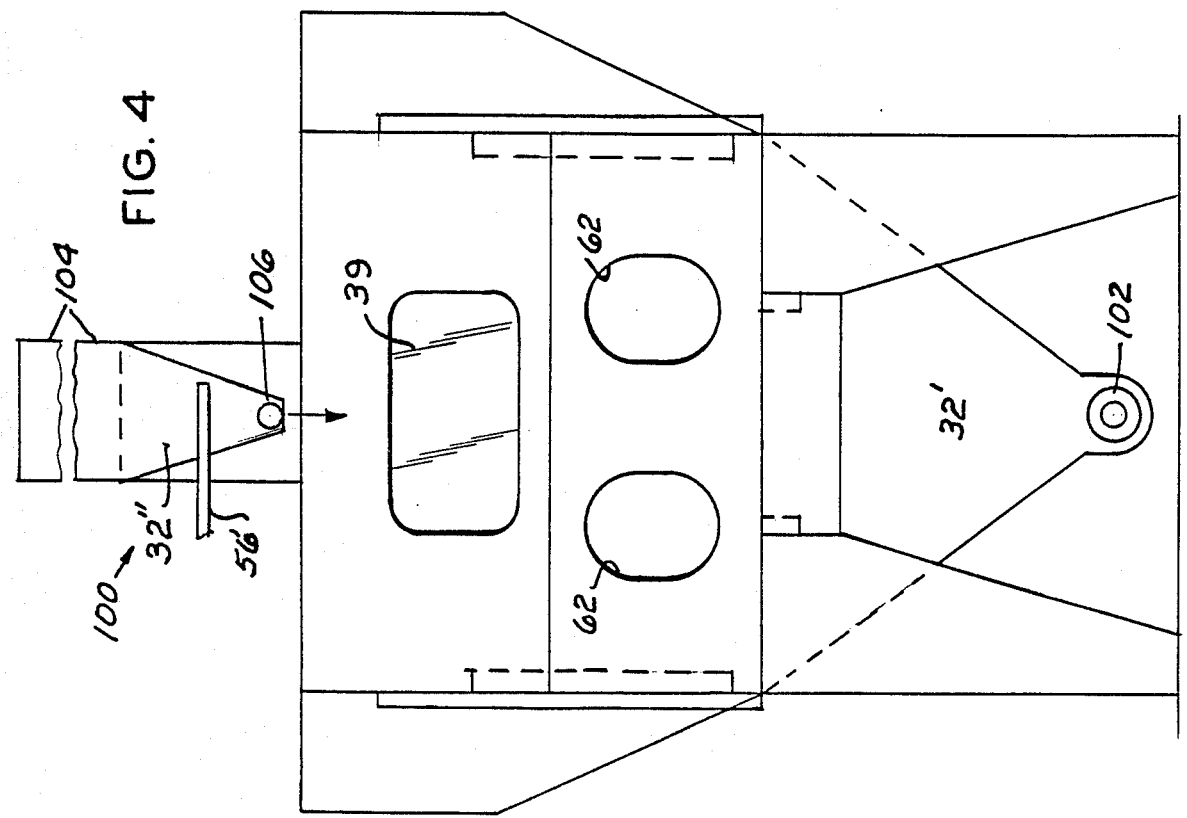

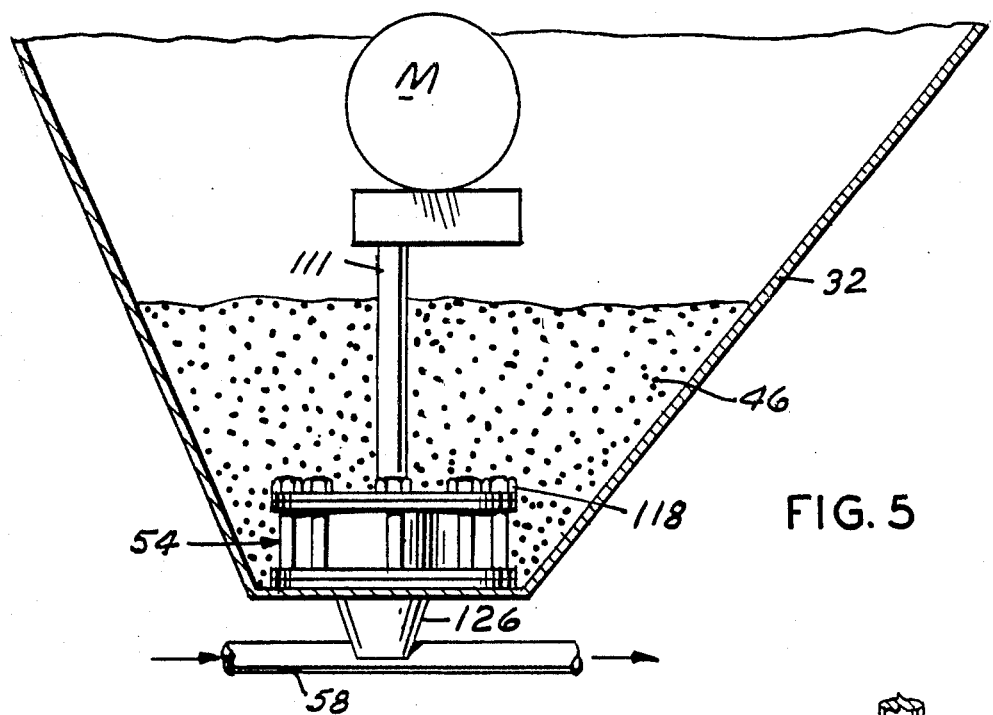
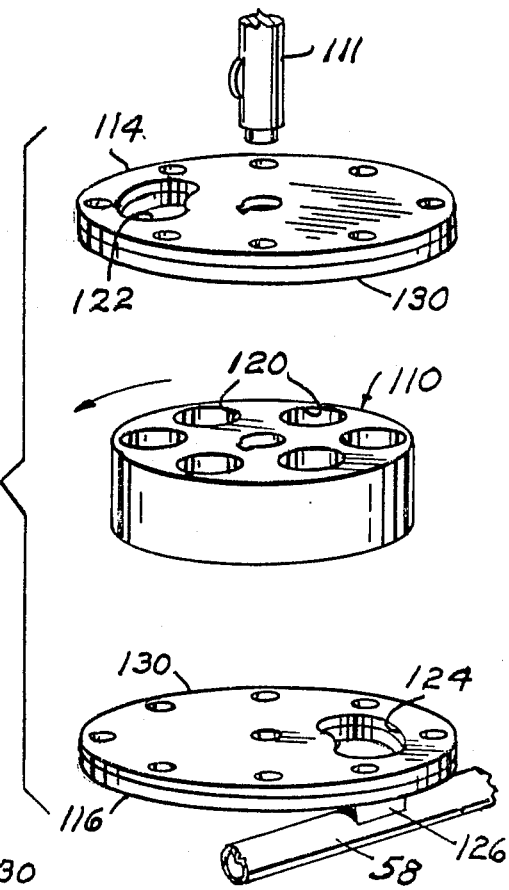
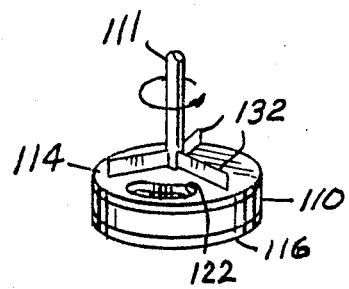
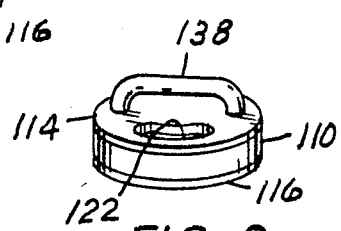
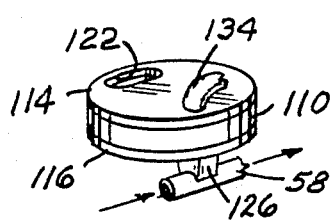
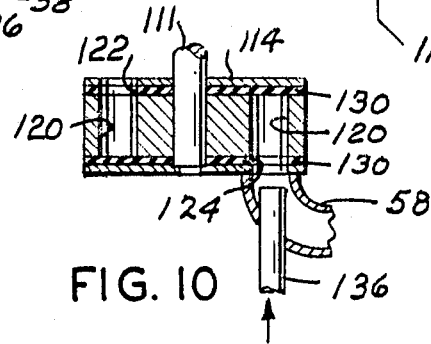

APPARATUS AND METHOD OF POWDER-METAL PEEN COATING METALLIC SURFACES

BACKGROUND OF THE INVENTION

1. Field of the Invention

The present invention relates to an apparatus and a process for bonding dry metallic powder to a substrate and more particularly to impact extruding particles to form a continuous thin film on a metallic surface.

The use of impact or peen bond coating techniques has been limited in scope and to laboratory environments as a result of the failure to implement tribology in a practical apparatus for field use. Other bonding methods, such as binders or adhesive merely hold together a mass of discontinuous particles on a given surface. Pressures required for extrusion of the coating material into a continuous coat can destroy the bond between the coating material and the surface of the substrate.

2. Description of the Prior Art

The most pertinent prior patent is believed to be U.S. Pat. No. 3,758,976. This patent discloses a nozzle for blasting a powdered metal mixed with a media against a surface to be coated but does not disclose requirements for utilizing the process in commercial applications. U.S. Pat. No. 4,552,784 utilizes substantially the same steps as the above patent but substitutes rapidly solidified metals to form the powder mix.

Other prior patents include:

U.S. Pat. No. 4,312,900 disclosing a method of treating sliding metal contact surfaces which pits the workpiece surface to be coated, buffs a solid lubricant into the pits and reblasts to partially cover the pits followed by power buffing the surface.

U.S. Pat. No. 3,574,658 disclosing a method of producing a dry-lubricated surface which coats a glass bead media with lubricant for blasting the workpiece surface leaving the lubricant bonded to the surface being coated. Since the beads break down during the process the entire mix must be discarded after one use.

Exploitation of these patents has not been generally achieved on a commercial basis possibly for the reason problems to be overcome in utilizing the process commercially was not set forth, particularly for the peening type methods or for the reason many coating materials disclosed do not require a peening effect since they may be blasted on and leave a coating smear on a substrate.

This invention is distinctive over these patents by providing a virgin surface on a substrate by removing all contaminants and microscopic burrs and maintaining a desired coating/media ratio combined with atmospheric control when impingement burnishing to bond particles on and form a continuous film on a substrate surface. The peen plating process of this invention produces a unique effect not disclosed in these patents in which the peening not only forms a plating function but also a burnishing operation promoting parallel crystal orientation of the solid lubricant employed. Without such parallel orientation, the coating is more subject to corrosion and a shorter wear life by rapidly wearing which also results in a higher coefficient of sliding friction.

SUMMARY OF THE INVENTION

The device to be coated is cleaned to remove any oils, gases, or other coatings. It is then blast cleaned with fine abrasive (100–325 mesh) such as aluminum oxide to remove surface contaminants such as oxides and to expose the base material anchor pattern. Water vapor content in the blast area, media and compressed gas are reduced to predetermined levels.

After cleaning the device, exposure to normal atmosphere must be kept at a minimum until coated. The coating operation uses a high pressure gas to impel a mixture of media and a powdered coating material against the surface to be coated. The coating is impinged or adheres to the surface and is further bonded to the surface and extruded into a continuous film by the peening effect of the media. Humidity and water vapor control is important.

Both the cleaning and the coating machines are similar in function to common air or wheel blast cleaning machines. The requirements in commercializing thin process coating are different from standard equipment in the following ways:

The humidity of the blast atmosphere must be controlled. Water content of the compressed air source and the media must be minimized. Condensation on the interior cabinet walls must be eliminated. Extra fine abrasive and micron size coating materials must be recycled at a minimal loss while having extra ventilation for reasonable operator vision. Mixes of media and coating materials of different densities must maintain consistent ratios in the blast area.

The principal object is to provide an apparatus and a method of forming a continuous coating bonded to the surface of a substrate by adherence and peen burnishing of a metallic powder impelled at high velocity and by molecular attraction of the metallic powder to the substrate surface.

BRIEF DESCRIPTION OF THE DRAWINGS

FIG. 3 is a mechanical diagram of a workpiece coating apparatus illustrating one type of material feeder;

FIG. 4 is a fragmentary mechanical diagram of a coating machine illustrating an alternative type of material feeder;

FIG. 5 is a fragmentary vertical cross sectional view, to a larger scale, of the coating feeder;

FIG. 6 is an exploded perspective view, with parts omitted for clarity, of the feeder components; and, FIGS. 7, 8, 9 and 10 are fragmentary perspective views, to a different scale, illustrating alternative embodiments of the feeder apparatus.

DESCRIPTION OF THE PREFERRED EMBODIMENTS

Figure 1:
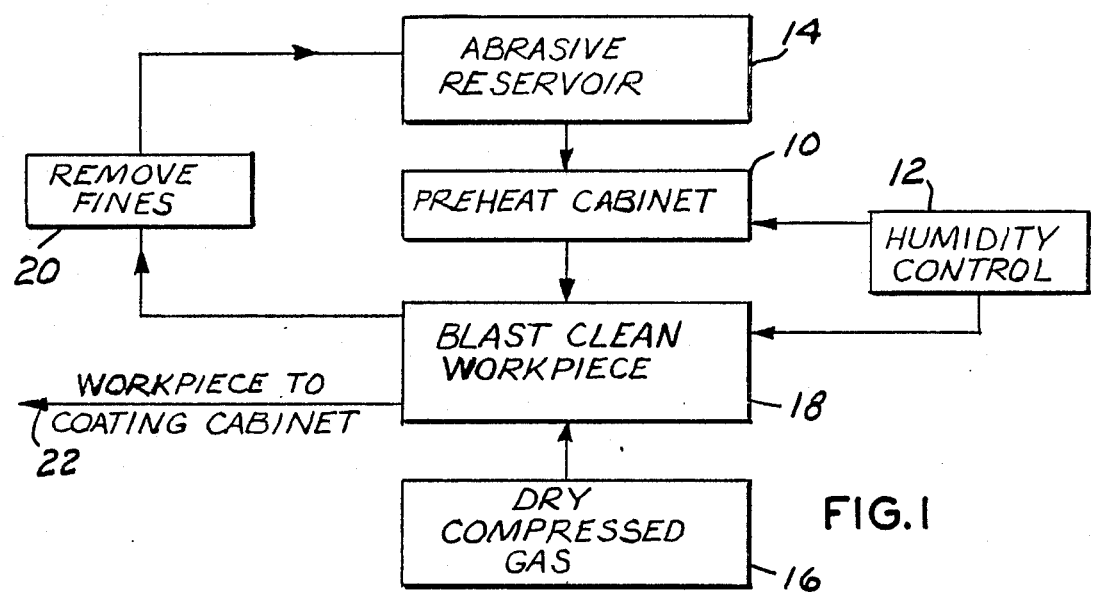
FIG. 1 is a flow diagram of the steps of cleaning a workpiece for coating.

Like characters of reference designate like parts in those figures of the drawings in which they occur.

In the drawings:

The steps of practicing the invention include producing a virgin surface on the area of a metallic workpiece to be coated in which all contaminants and microscopic burrs are removed. A blast cabinet 10 of substantially conventional design is provided and with the workpiece, not shown, in place the cabinet is preheated and humidity control achieved by a control 12. The cabinet reservoir 14 is prefilled with abrasive cleaning material and heated within the cabinet. Dry compressed gas 16 supplies the abrasive cleaning material to a blast gun which impacts the abrasive material on the area of the workpiece to be cleaned as in step 18. During and following the cleaning the abrasive material is returned to the reservoir with the fine particles thereof being removed, as at 20, while the cleaned workpiece is removed from the cabinet and transferred to the coating cabinet 30 (FIG. 2) as at 22.

Figure 2:
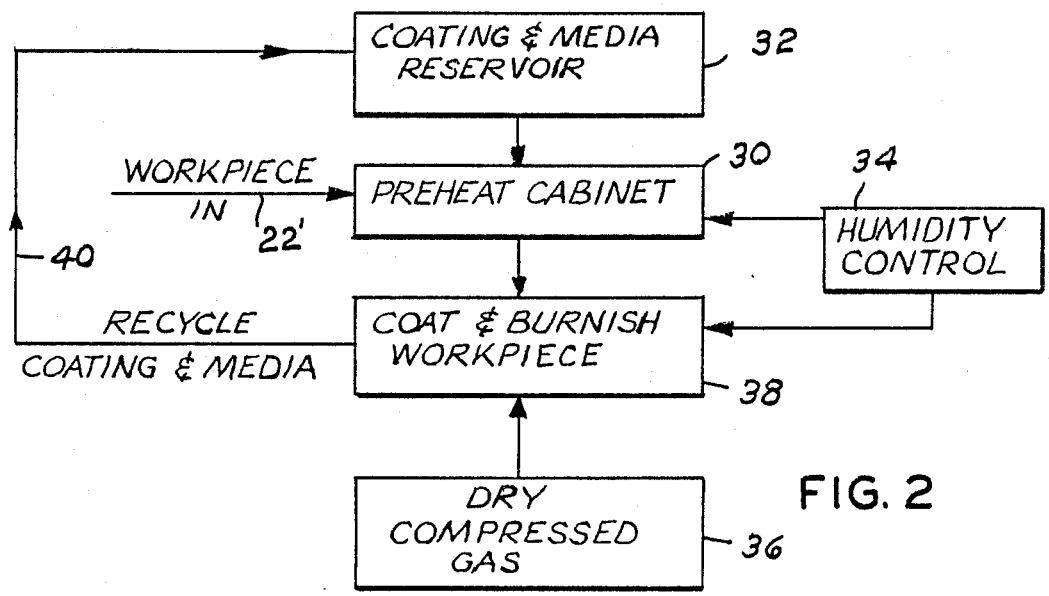
FIG. 2 is a flow diagram of the steps of coating a workpiece.

Referring to FIG. 2, which illustrates the steps of coating the workpiece, the coating machine 25 (Fig.), as presently described, or any substantially conventional coating machine, not shown, is employed to impact the coating material on the substrate to bond the coating particles thereto. The coating machine cabinet 30, including a reservoir 32, filled or containing a mixture of coating and media has the humidity thereof controlled by a humidity control 34. Dry compressed gas 36 supplies the coating and media to a blast gun, not shown, which is directed toward the workpiece to coat and burnish the precleaned surface thereon in the step 38. Following the film coating of the workpiece, the coating and media is recycled to the reservoir. The coating process mechanically bonds a malleable powder to the substrate and extrudes the bonded particles into a continuous coating which resists flaking and can only be removed by abrasive or external chemical erosion. Such mechanical bonding is preferred in many situations as opposed to electroplating which has a tendency for hydrogen embrittlement and its accompanying safety and environment problems. The mechanical bonding is more easily achieved by impelling the powdered metal at the substrate at high velocity wherein bonding occurs due to adherence to the substrate's surface profile (anchor pattern) and in the present invention is partially due to molecular attraction. An example of anchor pattern bonding involves a metallic powder with low shear characteristics, such as lead, aluminum, copper or tin which leave a smear when impelled against a substrate surface having a suitable anchor pattern. Such an anchor pattern is a discontinuous surface of peaks and valleys which the softer metal will cling to. An example of molecular attraction coating is molybdenum disulfide.

Molybdenum disulfide in a lubricant grade is refined from mineral molydenite and is commonly referred to by its trade name Molysulfide.

Molybdenum disulfide ($MOS_2$) is a crystal structure comprising layers arranged with the sulphur atoms on each side of the molybdenum atoms (S—Mo—S). Sulfur has a strong affinity for metallics so when the molybdenum disulfide is impelled onto a surface with enough pressure for reasonable surface contact, a molecular bond is achieved.

Both methods require that the substrate be free of any contaminants, coatings or chemical derivatives such as oxides or other products normally formed in its environment. While a bond may occur to the oxide any difference in expansion or compression rate of the oxide vs. the substrate will cause a fault in the coating and allow corrosion to undermine the coating. Care is also required in the selection of the cleaning media so that it will not initiate a chemical change or leave a residue on or impinge on the surface.

Liquid solvents can be used to remove hydrocarbons. Solvents used prior to blast cleaning must not leave a film. Abrasive blast cleaning is an effective way to remove dry, brittle contaminants.

The preferred cleaning abrasive is aluminum oxide. Silicon carbide, glass beads, polycarbonate grit, steel and iron abrasives, flint and mill slag abrasives can be used where they will not impinge into the surface or leave a film.

The abrasive must be large enough to fracture or abrade away the large areas of contamination and also contain enough fine material to scour the microscopic pores of the substrate. A polished substrate may require a wider abrasive size range to provide a more pronounced anchor pattern. When there is little molecular attraction between the coating material and the substrate and the shear coefficient is high to resist the extruding process, an extra surface preparation step such as etching the surface, may be necessary prior to the abrasive cleaning procedure.

Once the final cleaning cycle begins extreme care must be exercised to avoid the return of contaminants until the coating process is complete. The virgin substrate will have a strong affinity to react with atmospheric constituents or liquid or solid particulate during handling. In demanding situations dry inert atmospheres may have to be used. Less demanding requirements will need control of water vapor and any corrosive gases along with clean and careful handling during processing. Careless scaring of the surface can cause a starting point for coating failure.

Selection of coating materials must not only depend on purpose and design but also on substrate, purity, and size range. Generally, the coating material should be softer than the substrate. A harder coating material can be impinged into a softer substrate with this process but trying to form a continuous coating will be difficult because the substrate will deflect under the pressure of the impacting extrusion process causing fractures in the coating. Size is important to be able to more easily nest in the substrate's pores and the void areas. Generally small sizes are preferred depending on availability, cost and pyrophoric tendency. Purity of a coating material is important due to coating defects caused by tramp elements or processing chemicals.

The impact extrusion process will transform a mass of bonded particles or smears from the coating material into a continuous film. The process is accomplished by impelling a media against the bonded particles to force it deeper into the substrate's surface profile and spread it into a thin film. The extrusion process and the coating process can and is preferred be simultaneous with a barrage of coating material and impact media being hurled at the substrate. As the coating material clings to the surface, the impact media increases the bonding and begins the flattening and spreading process. To avoid hindering the coating process, the media must not contaminate the virgin surface of the substrate, exceed the coating material's plastic strength or tend to abrade away the developing film. It is preferred that the processing be combined so that the media may loosen any weakly bonded material and replace it with firmly bonded particles. It may be necessary to follow the combined process with a purely peening process to finally blend a continuous film.

Selection and sizing of the impacting media depends on the coating and substrate materials and finish desired.

The preferred impact media is steel or stainless steel shot if surface profile requirements permit. Conditioned polycarbonate or nylon media can be used for fine surfaces. Iron abrasives, glass beads and other silica based abrasives are not recommended because of their short life. Aluminum, copper, brass and zinc abrasives leave competitive smears and should be used only on special applications.

Any coating materials can be used that are dry powders and have the above described tendency toward molecular attraction, impingement, cladding or smearing. Precautions must be taken when the material has strong pyrophoric tendencies.

Mass, hardness and durability are important in selecting the type of media. The combination of mass, hardness and durability at a given impelling velocity determines the resulting change in the surface finish of the substrate. If the coating material is soft and pliable then the media can be on the soft side. On typical applications the size of the media is two to three times the size of the cleaning abrasive and the coating material. Generally it is not desirable to greatly modify the substrates' surface profile and therefore a small media is used. A variance of the surface profile is discussed hereinbelow in an example. Size affects the time required for coverage and the impact energy. One standard SAE size steel shot may have three to four times as many particles per pound as the next larger size. A diameter ratio of 2:1 can give an impact energy ratio of 8:1. A harder media is more efficient in transferring the energy of the larger mass.

The combination of durability and hardness is also important to coating integrity. The proper mass and size selection cannot produce a desired impact if the energy is lost in the disintegration of the media upon impact. Also the spent abrasive is difficult to remove from the coating/media mix causing the mix to be discarded early, increasing processing costs. The fractured media also produces sharp edges that tend to abrade the coating away. The desired shape of the media is spherical to produce a smoother, more uniform coating. Some media has long life because it is soft and leaves a smear on the clean substrate inhibiting proper coating bonding.

Controlling contamination also applies to new media. Many durable metallic medias are covered with an oxide due to processing and exposure to the atmosphere. Prior to use the media should be cleaned and surface contamination removed. It is advisable to coat the clean media with the intended coating material to reduce corrosion before use.

The cleaning and the coating processes are similar to blast cleaning and peening processes and must be housed in equipment to contain the materials and to control the environment. Coating and abrasive cleaning materials are costly and should be recycled to minimize processing costs. Since many of the applications will require manually directed processing, the internal machines environment will have to maintain reasonable visibility. Useable suspended material will have to be captured and returned for reuse. Inert dry atmospheres may be required for some application but common work can be accomplished in relatively low humidity environments. Desiccant dryers or heaters can be used to reduce the water vapor content of the internal atmosphere of the stored coating or abrasive materials. Compressed air used for blasting must be clean and dry. Absorption of water vapor from the equipment must be minimized.

The cleaning machine can use a common suction air blast nozzle and a suction pick up regulator. Most common reclaimers are not efficient with the very small abrasive used so the pick-up point for the exhaust ventilation line is placed in the top of the cabinet in a plenum chamber to catch only the air-borne fines. A cyclone reclaimer is placed between the cabinet and the dust collector to save any useable fine abrasive.

Common media accelerating devices can be used such as air blast nozzles or centrifugal blast wheels to impel the materials in the cleaning and coating processes. It is essential, however, that devices are used to insure the mix of coating material to media remains consistent. The flow characteristics of the coating material vs. the media will be different due to the density, size and shape of each constituent. Both throwing devices move air and will tend to separate the lighter material and leave the heavier behind. A positive feeding device must be used to prevent inconsistent mix ratios. Filters used to prevent escape of the materials must be cleaned continuously to avoid accumulation and change of the balance of the mix.

The coating machine 25 (FIG. 3) comprises a generally rectangular upright cabinet 30 defining a workpiece blast area 38, having a hopper or transparent observation panel 39 (FIG. 4), overlying a reservoir 32 containing a coating and media material mix 46 and having a closed circuit air flow means 48. The reservoir 32 is generally inverted frustoconical in general configuration for concentrating the heavy coating/media material 46 falling by gravity from the blast area 38 through the foraminated horizontal partition 50. The reservoir contains a gearmotor M driving mixing plates 52 and a coating/media feeder means 54 as more fully described hereinbelow. A heater 56 is interposed between the mixing plates 52 for humidity control from a control box, not shown. The preferred range of relative humidity is 35–45% which can be accomplished by heating the incoming air to 20°–30° F. over ambient or by using a desiccant dryer, not shown. Tubing 58 connected with the feeder means 54 and a source of dry gas 36 supplies a stream of the coating/media mix 46 to a manually controlled blast gun 59 disposed within the blast area 38 by a flexible tube portion 60. Access to the blast gun is obtained by protective hand/arm glove means 61 extending inwardly of the cabinet from hand/arm apertures 62 (FIG. 4). The blast gun may be supplied with a nozzle as described by the above named U.S. Pat. No. 3,754,976.

The air flow means 48 includes a motor driven blower or fan 63 mounted above the blast area 38 which generates a downdraft flow across the baffle 64 and adjacent the inner surface of the transparent panel 39 and toward the workpiece as indicated by the arrow 65. A downwardly projecting baffle 66 spaced forwardly of the blast area compartment back wall 68 forms an upwardly open air flow path 70 for air to exit the blast area and return to the fan through a common pulse-type cartridge system filter means 72, as indicated by the arrows 74.

The filter means 72 includes an open end sleeve-like filter cartridge 76 vertically disposed axially rearwardly of the back wall 68 and communicating, at its uppermost end, with the fan intake. The filter is within the upper portion of a coating and media fines collecting compartment 78, defined at its lower limit by downwardly converging walls having sufficient slope to avoid stress of non-circulating material, emptying into the reservoir through a partition wall bypass 80. The bottom of the filter is closed by an end plate 81 to insure filtering the air and its top end is partially restricted by an inwardly projecting annular flange 84. The purpose of the baffles 64 and 66 directing the air flow paths 65 and 74 is for creating a negative pressure in the blast area 38 to permit visual inspection of the workpiece during the coating process. The filter 76 is preferably a flexible wall type filter so that a motor driven shaker or air pulse means 86 mounted exteriorily of the cabinet 30 and having the outlet end portion of its discharge tube 90 disposed adjacent the opening of the flange 84 may generate a filter wall flexing action (expanding and contracting) for dislodging coating/media fines clinging to the wall surfaces of the filter.

The coating machine 100 (FIG. 4) diagrams a coating/media collecting and feeding system when steel shot is utilized as the media. A reclaim screw means 102 is disposed at the depending limit of the reservoir 32' for moving the coating mix 46 to a bucket elevator 104 depositing the mix in an elevated reservoir 32" containing a heater 56'. A screw feeder 106 in the depending limit of the reservoir 32" reblends the coating mix and feeds it to a suction gun.

EXAMPLE I (Die Cast Molds)

Application of solid lubrication powders are good examples because they utilize many of the process features. The process can clean, deburr, and modify the surface to improve life or better retain other lubricants, provide a coating and burnish the coating into a thin, continuous film.

The process can be applied to cast die cast molds. The molds are exposed to hot aluminum and routinely have problems of soldering to the mold and mold release break down causing carbon build up and surface defects in the molded part. A coating of molybdenum disulfide by this process eliminates release problems and the build up of carbon by providing a stationary coating with a better wetting surface and microscopic pockets to improve the retention of the liquid mold release.

The powder selected for the coating process is a molybdenum disulfide with a size range of 1-100 microns and a median size of 30 microns. Purity level is +98% with molytrioxide, oil and acid number less than 0.3% per element. The dies having been thoroughly degreased before processing. The media to be used is a steel shot, −58 mesh +120 mesh, with a hardness range of 40-50 Rc. The shot was previously conditioned in a blast cleaning machine to remove surface scale and oxide and then tumbled with cleaners to remove any graphitic smear and then tumbled with molybdenum disulfide as a protective coating before compounding the coating mix.

The coating mix molybdenum disulfide and steel shot is placed in an airblast machine equipped with a heater in the coating mix reservoir or storage area to maintain a set temperature based on ambient humidity and capable of a range of 100°-250° F.

The coating machine can be equipped with various media handling designs. Since suction pick up does not produce sufficient line velocity to convey steel media a coating machine 100 may be utilized in which a bucket elevator 104 moves the mixture from the bottom of the cabinet reservoir 32' to the top of the cabinet. The screw feeder 106 provides flow control and reblends the mixture. The mixture is gravity fed to a suction blast gun or a blast wheel.

Another media handling approach is to use a pressure fed device. A common abrasive pressure blast tank, not shown, receives a load of abrasive which is then pressurized to the desired blasting pressure. The blast line is located below the tank and then the pressure is equalized, the abrasive flows by gravity into the blast line. The available tanks have no means of preventing segregation of the mix or an easy way of minimizing the water vapor of the mix during storage.

The preferred pressure feeding device 54 (FIGS. 4-10) is located at the bottom of the hopper or reservoir 32 for gravity feed and consists of a cylinder 110 angularly rotated horizontally by the drive shaft 111 of the gearmotor M having a top plate or lid 114 and a base plate or bottom 116 interconnected as by bolts 118. The cylinder is characterized by a circular row of vertical through bores 120 of selected diameter. The lid 114 is provided with an opening 122 adjacent its periphery to allow the mixture 46 to flow into the cylinder bores 120. Similarly the bottom 116 is provided with a companion aperture 124 adjacent its periphery but mismatched with the lid opening 122 as by 180°.

The bottom plate aperture 124 communicates with the air pressure supplied tubing 58 by a funnel-type sleeve 126. Layers of sealing material 130 having apertures cooperating with the plate apertures 122 and 124 are interposed between the cylinder 110 and the respective top and bottom plates for the purpose believed apparent.

Other embodiments of the pressure feeder may be utilized to handle material difficult to feed. For example, mixing or scraping blades 132 radially secured to the gearmotor shaft 111 (FIG. 7) and overlying the top plate 114 insure feeding the mix 46 into the aperture 122 and the cylinder holes 120. An auxiliary air line 134 within the reservoir 32 and communicating with the bottom plate discharge aperture 124 through the top plate (FIG. 8) insures forcible ejection of mix contained with each succeeding cylinder hole 120 into the tubing 58. Another solution for forcing the mix 46 out of the respective cylinder hole 120 as it is disposed over the discharge aperture is separating the tubing 58 at the position of the funnel sleeve 126 so that one end 136 of the tubing projects toward the axis of the respective cylinder holes when aligned with the bottom plate discharge 124 (FIG. 9). Alternatively the pressure in the cylinder holes 120 leaving the position of the discharge aperture 124 may be bridged to the cylinder holes 120 leaving the filling aperture 122 by an inverted U-shaped air line 138 (FIG. 9) mounted on the top plate 114.

Although the mix 46 is injected by the feeder 54 into the discharge tubing 58 in individual charges, the mix will spread itself in the pressurized stream into a homogeneous distribution as it travels through the tubing.

Once the mixture has been fed through the blast gun most of the mix 46 will fall to the bottom of the reservoir 32. The suspended material will be caught by the ventilation air filter 72. The fine particulate collection system must be capable of frequent cleaning and returning the material to the storage reservoir to avoid upsetting the balance of the mix.

The blast area 38 must be kept free of any strongly corrosive or oxidizing gases. To avoid vapor condensation on the inner surfaces of the metallic walls of the enclosure and to remove water absorbed by the dust collector cartridges, the equipment is run with the heat on prior to processing. Compressed air used for the pressure blasting or for the pulse type cartridge system must be oil and water vapor free.

Once the equipment has been preheated and the mold degreased, the mold is blast cleaned in the areas to be coated. All of the blast cleaning abrasive is removed from the mold. The mold should be moved to the coating machine with minimal hesitation to minimize oxidation of the substrate.

The coating is meant to be used in conjunction with the user's normal mold release agents to control situations beyond the normal limits of the agents.

Molybdenum disulfide maintains continuity up to 750° F. and can handle 400,000 psi loading, leaving no residue to discolor the work. The coating is stationary and will not migrate away from heavily loaded areas. The process can be used to produce microscopic indentations which serve as lubrication reservoir to better hold the lubrication under heat or pressure. The coating also provides a more easily wetted surface to draw liquid lubrication into difficult to reach areas.

The use of molybdenum disulfide also highlights a unique feature of the burnishing portion of the process. Its coating characteristics depend on how the crystal is attached to the surface. If the crystal is oriented with its base plane parallel to the surface, the coefficient of friction is 0.1 compared to 0.26 when sitting on an edge. The bond is also not as strong on the edge. In practice, the impacting media replaces or repositions the weaker bonds. Instead of extruding this through material, the burnishing effect slides the layers around to form a continuous film.

The strength of molybdenum disulfide also permits a variation of the process to incorporate a peening function. Burnishing becomes peening when the substrate surface is modified by repeated deflections causing a reshaping of the outer surface. The outer grain structure loses its symmetry as the metallic grains lengthen and become entwined. This surface modification lessens the tendency for cracking as the surface expands and contracts in heating and cooling.

Larger and harder steel shot than the above example can be used as the media to impact this peening function during the coating process to greatly extend the life of the mold. Current practice is to use peening to close up existing cracks in the molds. It is recommended that this new process be used with new molds to reduce the tendency of heat stress cracking and to routinely reprocess the molds before heat stress cracking is observed.

EXAMPLE II (Tooling)

Another example is the use of the process in coating tooling with a solid lubricant such as molybdenum disulfide. The process is the same as the coating of the molds by preheating the equipment, controlling the atmosphere and completing the cleaning and coating operations.

The cleaning of a tool produces an additional feature. The ground cutting edge of a tool retains burrs. These burrs can fold over and cover part of the cutting edge. The cleaning process removes these burrs to leave a sharp cutting edge.

The molybdenum disulfide coating reduces the high friction and galling in areas when the chips are formed. Lowering friction reduces the build up of heat which tempers the tool. The chips that weld to the cutting edge of a broach cause unacceptable work finish. The burnishing effect can produce compressive stresses in fine cutting edges of tools like taps to substantially improve the fatigue strength of the teeth.

EXAMPLE III (Bearings)

Another example of the benefits of the process is through the use of molybdenum disulfide coating of sliding bearing surfaces. All new bearing surfaces are not perfectly flat and are supported by the high points. Break-in periods with conventional lubricants result in the point loading of these peaks exceeding the lubricants capability and the metal to metal contact causes cold welding to occur. The cold welding results in these peaks being torn away, disrupting the surface, until the mating surfaces are flat enough to be protected by the strength of the lubricant's film.

This impact extrusion process can provide a continuous coat of molybdenum disulfide to prevent metal to metal contact in the peak areas. The film strength of molybdenum disulfide allows the bearing load to flatten the peaks into the surface rather than tearing them from the surface. This promotes run-in vs. wear-in.

As mentioned hereinabove and as believed obvious other dry lubricants may be used in this process such as tungsten disulfide or titanium disulfide. However the results obtained with molybdenium disulfide has been superior.

Obviously the invention is susceptible to changes or alterations without defeating its practicability. Therefore, I do not wish to be confined to the preferred embodiment shown in the drawings and described herein.

I claim:

1. The method of lubricant coating a substrate with a compound consisting of:
   (a) providing a quantity of molybdenum disulfide as a powder form dry lubricant;
   (b) providing a quantity of steel shot of predetermined mass;
   (c) commingling the molybdenum disulfide and steel shot to form a coating mix;
   (d) continuously agitating the coating mix;
   (e) maintaining a desired range of relative humidity surrounding the coating mix by heating air, surrounding the coating mix, to a temperature of approximately 20° F. above ambient temperature; and,
   (f) impacting a stream of the coating mix on the substrate at a predetermined velocity for a predetermined period of time for fusing and burnishing a portion of the dry lubricant on the substrate.

* * * * *